Aug. 6, 1929.                    H. JUNG                    1,723,241

SAUERKRAUT CUTTING MACHINE

Filed Jan. 29, 1927

INVENTOR
Heinrich Jung
BY
his ATTORNEY.

Patented Aug. 6, 1929.

1,723,241

UNITED STATES PATENT OFFICE.

HEINRICH JUNG, OF MAGDEBURG, GERMANY, ASSIGNOR TO IVAN JOSEPHS, OF NEW YORK, N. Y.

SAUERKRAUT-CUTTING MACHINE.

Application filed January 29, 1927, Serial No. 164,588, and in Germany December 15, 1925.

My invention relates to an improved, mechanically actuated cabbage cutting machine designed for operation on a commercial scale, and its principal object is to provide a machine for cutting long fibres or strands from heads of cabbage.

Figure 1:
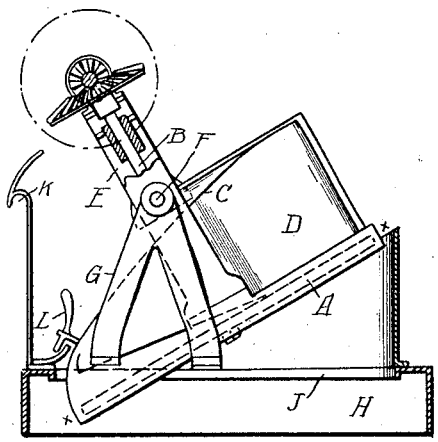
Figure 3:
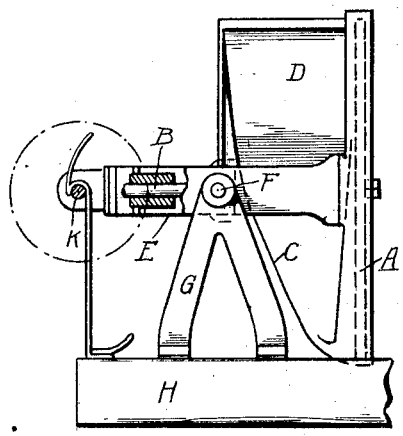
Figure 2:
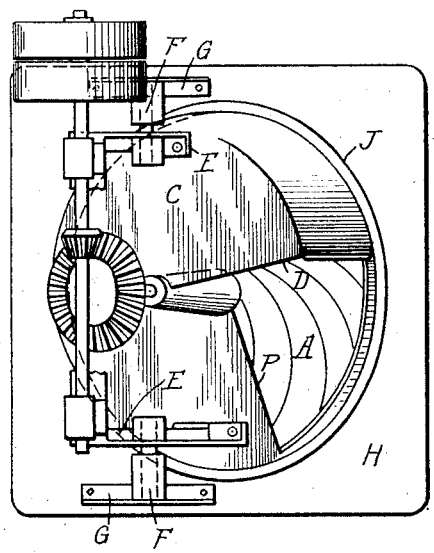
Figure 4:
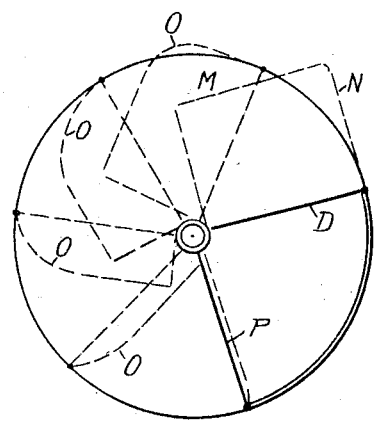

The invention is illustrated in the accompanying drawings, wherein Fig. 1 is a side elevation of the machine in operative position; Fig. 2 is a plan thereof; Fig. 3 is an elevation with the cutter head raised and Fig. 4 is a plan of a detail.

Referring to the drawing, in which like reference characters refer to like parts in the several views, A is a cutter head provided with flat cutting knives. The cutter head A is carried at one end of a driving shaft B, and is covered by a flat spirally formed hood C which serves as a stop or abutment for the heads of cabbage to be cut. As hereinafter more fully explained, the radial cross sectional profile of the hood is formed in a special manner.

The cutter head A in my improved machine is not, as is usually the case, arranged horizontally, but in an inclined plane $x$—$x$ as shown particularly in Fig. 1. The result of this inclined arrangement of the cutter head is that cabbage heads introduced through the hood opening D are subjected to immediate cutting action, because, due to the inclined plane of the knife surfaces, the cabbage heads are at once clamped between the hood and the cutter head. This arrangement is highly desirable for the purpose of producing long fibre kraut. When the cutter head is arranged horizontally under the spiral hood the heads of cabbage do not readily move into a position where they are quickly clamped between the cutter head and hood; the heads of cabbage roll around on the cutter head and are cut at many places by the rapidly rotating cutter. Even after the heads are properly positioned, frequently by dangerous hand manipulation, a short fibred kraut is produced because of the many places in which the cutting action took place; kraut of this kind is not desirable and the machine by which it is produced is subject to justifiable criticism. If, however, the cutter head and hood are arranged in an inclined plane in accordance with the present invention, all hand manipulation is obviated and the heads of cabbage automatically assume their proper cutting position and long fibred kraut is cut immediately.

To render the inclined arrangement of the cutter head and hood possible I mount the same in a frame E capable of oscillating about pivots F bearing in standards G extending upwardly from a plate or table H. The plate is provided with an annular opening J into which the cutter head and hood may extend:

The frame E may be moved about the pivots F a sufficient distance to enable the cutter head to stand in a substantially vertical position, and it may be held in this position by a latch mechanism K so that the heavy cutter head is readily accessible and may be easily and safely removed from and replaced on the shaft. After release of the latch the cutter head and hood may be moved into the normal inclined operating position, without effort, and may be secured in this position by a second latch mechanism L.

In order that the inclined cutter head A may be availed of to its fullest capacity, the spirally shaped hood C may be of different cross sectional profiles. At the opening D the profile of the hood is formed by two lines M and N perpendicular to each other. In the continuation of the spiral surface these lines merge (Fig. 4) into a bent curve O with a continually increasing curvature radius, and at the end of the spiral surface where the latter approaches the cutter head A at an acute angle, the lines again assume a rectilinear form P. Fig. 4 shows in dotted lines a number of radial cross sections through the hood.

The advantage of this profile arrangement is that the rectilinear profile at the entrance point of the heads of cabbage permits of the simultaneous introduction of a plurality of heads. By the succeeding gradual transition to bent profile curves the required pressure against the cabbage heads, which are forced outwardly by rotation of the cutter head and which decrease in size and weight, is maintained. Finally, as the result of the change of shape from the curved profile to the straight line form at the end of the spiral surface which approaches the cutter head at an acute angle, any uncut portion of the cabbage head is completely cut up so that only fibres, and not uncut cabbage, issue from the machine.

I claim:—

1. In a cabbage cutting machine, the combination with an inclined cutter head, of a spiral hood thereover and a pivotal supporting means for the head and hood whereby the cutter and hood may be swung out of operating position for removal.

2. In a cabbage cutting machine, the combination with an inclined cutter head, of a spiral hood thereover and a pivotal supporting means for the head and hood whereby the cutter and hood may be swung out of operating position for removal, and means for actuating the cutter head.

3. In a cabbage cutting machine, the combination with a pivoted cradle frame, capable of being swung outwardly to remove parts comprising a cutter head carried by the frame supported in an inclined plane, and a spiral hood over said cutter head.

4. In a cabbage cutting machine, the combination with an inclined cutter head, of a hood thereover having an entrance opening formed by two perpendicular walls, a body formed of spiral curves and a rectilinear exit opening and a pivotal supporting means for the head and hood whereby the cutter and hood may be swung out of operating position for removal.

5. In a cabbage cutting machine, the combination with an inclined cutter head, of a hood thereover having an entrance opening formed by two perpendicular straight walls, a body portion comprising a plurality of bent curved surfaces and a rectilinear exit opening arranged at an acute angle to the operative surface of the cutter head and a pivotal supporting means for the head and hood whereby the cutter and hood may be swung out of operating position for removal.

In testimony whereof I affix my signature.

HEINRICH JUNG.